(12) United States Patent
Steiner et al.

(10) Patent No.: US 10,051,418 B2
(45) Date of Patent: Aug. 14, 2018

(54) SYSTEMS, METHODS, AND DEVICES FOR PROVISIONING WIRELESS NETWORK INITIATED LOCATION OR TIME OF FLIGHT REQUEST

(71) Applicant: Intel Corporation, Santa Clara, CA (US)

(72) Inventors: Itai Steiner, Tel Aviv (IL); Gaby Prechner, Rishon Lezion (IL)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 14/582,665

(22) Filed: Dec. 24, 2014

(65) Prior Publication Data

US 2016/0192137 A1 Jun. 30, 2016

(51) Int. Cl.
*H04W 4/02* (2018.01)
*H04W 64/00* (2009.01)

(52) U.S. Cl.
CPC ......... *H04W 4/023* (2013.01); *H04W 64/003* (2013.01)

(58) Field of Classification Search
CPC ....... H04W 8/08; H04W 60/00; H04W 64/00; H04W 12/02; H04W 12/06; H04W 88/02; H04W 4/023; H04W 64/003; H04L 29/08657; G01S 5/02; G01S 19/00
See application file for complete search history.

(56) References Cited

U.S. PATENT DOCUMENTS

| 8,416,710 | B2* | 4/2013 | Brisebois | H04W 24/00 370/338 |
| 2008/0123608 | A1* | 5/2008 | Edge | H04W 4/02 370/338 |
| 2012/0202447 | A1* | 8/2012 | Edge | H04W 4/02 455/404.2 |

(Continued)

OTHER PUBLICATIONS 802.11 Working Group of the LAN/MAN Standards Committee of the IEEE Computer Society, Draft Standard for Information technology—Telecommunications and information exchange between systems; Local and metropolitan area networks—Specific Requirements, Part 11: Wireless LAN Medium Access Control (MAC) and Physical Layer (PHY) Specifications, Downloaded on Dec. 16, 2014 UTC from IEEE Xplore, pp. i-vi, IEEEP802.11-REVmc/D3.0, Jun. 2014, IEEE, New York.

*Primary Examiner* — Christopher M Brandt
(74) *Attorney, Agent, or Firm* — Eversheds Sutherland (US) LLP

(57) ABSTRACT

Example systems, methods, and devices for provisioning in a wireless network can be provided. In one embodiment, a method can include storing, by a wireless communication device, credentials of one or more trusted network entities in the wireless network, receiving, by the wireless communication device, a request for location information from one or more access points, and transmitting, by the wireless communication device, location information to the one or more access points. The request may include location configuration information request, time of flight request or a fine timing measurement request. The method may also include (Continued)

storing one or more aging parameters for one or more trusted network entities. The credentials include basic service set identification or service set identification. Certain methods, apparatus, and systems described herein can be applied to 802.11ax or any other wireless standard.

17 Claims, 7 Drawing Sheets

(56) References Cited

U.S. PATENT DOCUMENTS

| | | | | |
|---|---|---|---|---|
| 2013/0054729 | A1* | 2/2013 | Jaiswal | H04W 4/02 709/213 |
| 2014/0140331 | A1* | 5/2014 | Lee | H04L 63/10 370/338 |
| 2014/0235266 | A1* | 8/2014 | Edge | H04W 64/00 455/456.1 |
| 2015/0257120 | A1* | 9/2015 | Prechner | H04W 64/003 455/456.1 |
| 2016/0021560 | A1* | 1/2016 | Reshef | H04W 24/10 370/338 |
| 2016/0044504 | A1* | 2/2016 | Edge | H04W 64/00 455/456.3 |
| 2016/0080378 | A1* | 3/2016 | VanBlon | H04W 4/02 455/410 |
| 2016/0127899 | A1* | 5/2016 | Jabara | H04W 12/06 455/411 |
| 2016/0183058 | A1* | 6/2016 | Nicosa | H04W 8/245 455/456.6 |

* cited by examiner

SYSTEMS, METHODS, AND DEVICES FOR PROVISIONING WIRELESS NETWORK INITIATED LOCATION OR TIME OF FLIGHT REQUEST

TECHNICAL FIELD

Embodiments described herein generally relate to wireless networks.

BACKGROUND

There are many devices today that utilize the global positioning system (GPS). GPS is based on a constellation of twenty-four satellites orbiting around the earth that broadcast precise data signals. A single GPS receiver is capable of receiving these signals and can calculate its position (latitude and longitude), altitude, velocity, heading and precise time of day using data signals from at least four GPS satellites. Thus, these GPS receivers can locate themselves anywhere on the planet where a direct view of the GPS satellites is available.

However, a device utilizing GPS has many limitations. One significant limitation is that GPS is generally unsuitable for indoor positioning applications since a direct view of the GPS satellites is not available.

DETAILED DESCRIPTION

Figure 1:
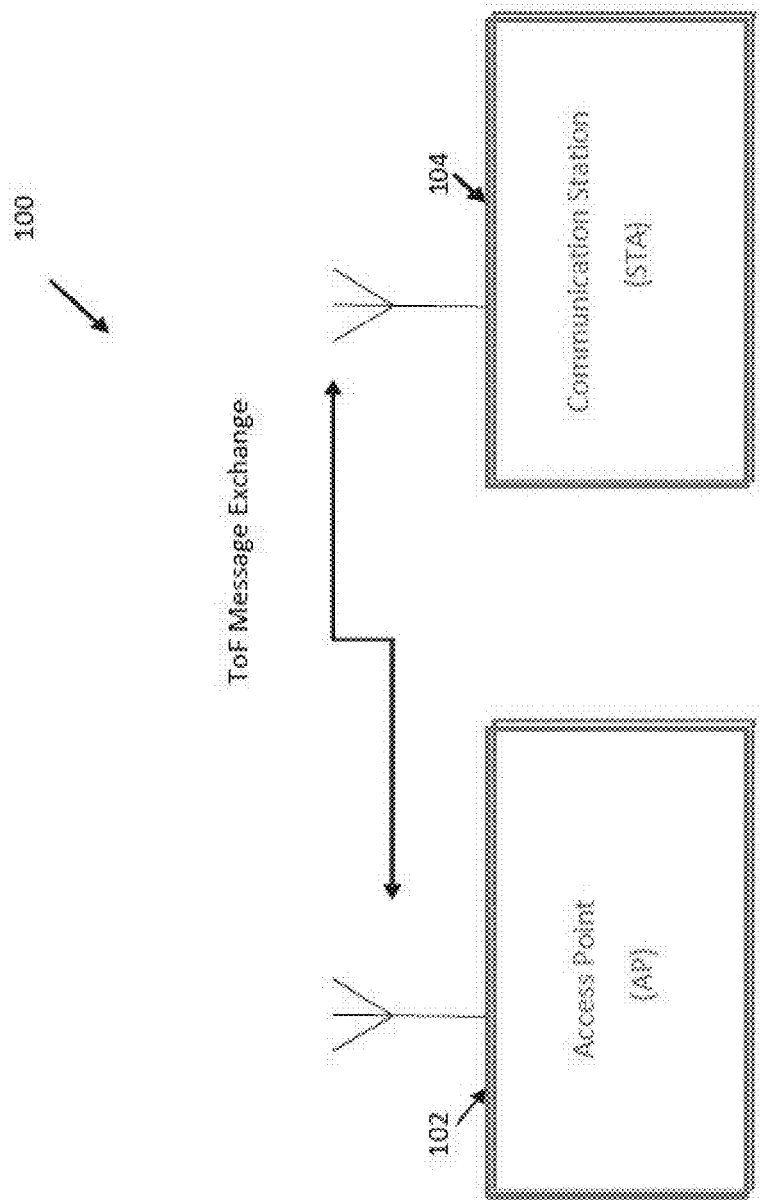
FIG. 1 is a network diagram illustrating an example network environment, according to one or more example embodiments.

The Wi-Fi Alliance has recently established a Wi-Fi Alliance certification for IEEE 802.11 based indoor positioning, details of which are provided in the IEEE 802.11-REVmc specification. The advancement detailed in the specification provides support for increased timing resolution and makes other changes to support mobile device location determination using IEEE 802.11. Part of the modifications allow an access point (AP) to initiate a location request to a communication station (STA) and receive the results using local configuration information (LCI) request. The STA may start location or ranging procedure using time of flight (ToF) or fine timing measurement (FTM) requests and report its location or ranges to the requester. This, however, poses a security or privacy threat for the device/user, as no provisioning mechanism is in place that ensures the location requester has the credentials to do so.

Example embodiments in this disclosure relate to certain systems, method, and devices for indoor position using Wi-Fi network initiated location or ToF or FTM requests. Example systems, methods, and devices also provide IEEE 802.11 LCI request variants as a method to trigger network initiated location request for Wi-Fi ToF or FTM. Example embodiments of certain systems, methods, and devices can also provide provisioning functionality to establish privacy, quality of service (QoS), and other services in addition to the LCI request. In order to provide provisioning, the Wi-Fi location engine may store or hold, for example, a list of Trusted Network Entity credentials, and optionally, an aging parameter. In another example embodiment, the Wi-Fi location engine may access the list of THE credentials, for verification purposes, from a remote SUPL server.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Details of one or more implementations are set forth in the accompanying drawings and in the description below. Further embodiments, features, and aspects will become apparent from the description, the drawings, and the claims. Embodiments set forth in the claims encompass all available equivalents of those claims.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station. An access point may also be referred to as an access node, a base station or some other similar terminology known in the art. An access point may also be called a mobile station, a user equipment (UE), a wireless communication device or some other similar terminology known in the art. Embodiments disclosed herein generally pertain to wireless networks. Some embodiments c a n relate to wireless networks that operate in accordance with one of the IEEE 802.11 standards including the IEEE 802.11ax standard.

FIG. 1 is a network diagram illustrating an example network environment suitable for a FTM procedure, according to some example embodiments of the disclosure. Wireless network 100 can include one or more communication stations (STAs) 104 and one or more access points (APs) 102, which may communicate in accordance with IEEE 802.11 communication standards, including IEEE 802.11ax. The communication stations 104 may be mobile devices that are non-stationary and do not have fixed locations. The one or more APs may be stationary and have fixed locations. The stations may include an AP communication station (AP) 102 and one or more responding communication stations STAs 104. Example embodiments disclosed may also be used between two or more STAs, for example, without an AP.

In accordance with some IEEE 802.11ax (also referred to as High-Efficiency WLAN (HEW)) embodiments, an access point may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

In other embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In certain embodiments, a 320 MHz contiguous bandwidth may be used. In other embodiments, bandwidths of 5 MHz and/or 10 MHz may also be used. In these embodiments, each link of an HEW frame may be configured for transmitting a number of spatial streams.

One example embodiment is a method for provisioning Wi-Fi based network initiated location or ToF request. The method may provide IEEE 802.11 local configuration information (LCI) request variants, such as ToF or FTM requests, to trigger network initiated location request for Wi-Fi. The method may include adding provisioning functionality to establish privacy, quality of service (QoS), and other services in addition to the LCI requests. In order to provide provisioning, the Wi-Fi location engine may store or hold a list of trusted network entity (TNE) credentials, and optionally, an aging parameter, for example. In one example embodiment, the Wi-Fi location engine may include an entity that may use the Wi-Fi chipset and network stack, for example, layer 2 media access control (MAC) layer or above, facilities that may produce, for example, FTM or ToF measurements results. The Wi-Fi location engine may use those results and other data, such as APs known location, to determine a device's position. The Wi-Fi location engine may be embedded in the Wi-Fi chipset itself or in one or more processors that may use the Wi-Fi chipset or part of the main central processing unit (CPU) running a software, such as the driver, that may use the Wi-Fi FTM/ToF measurements. In one example embodiment, TNE credentials may include a unique network identifier such as basic service set identification (BSSID), for example. LCI requests to the device may only be accepted if originated by such TNEs. Thereafter, the device may trigger a location positioning or ranging session and reporting, according to the request. LCI requests from unknown BSSIDs may be refused by the device. According to one example embodiment, authentication of the BSSID and the originator of the LCI request may be established via an association procedure and can be mandated by a provisioning scheme, for example.

The method may also include network-based provisioning by extending assisted GPS protocols, such as open mobile alliance (OMA) secure user plane location (SUPL) and third generation partnership project (3GPP) long term evolution (LTE) positioning protocol (LPP) that may provision Wi-Fi based network initiated location requests and may provide a TNE list, including a BSSID or service set identification (SSID) list, through a remote SUPL server that may store this information, for example.

Figure 2:
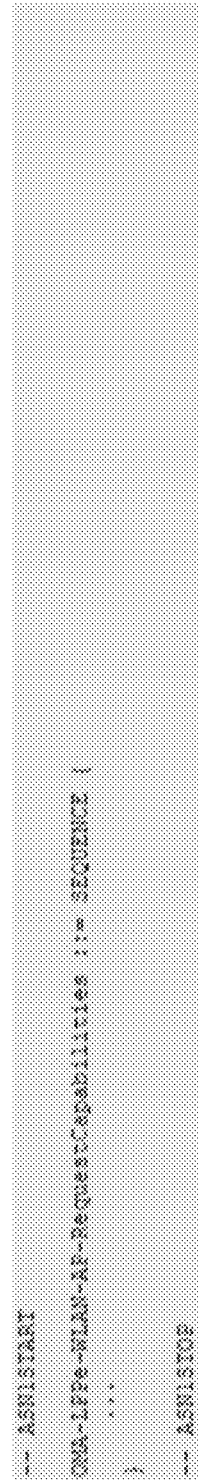
FIG. 2 illustrates example APIs for use in systems and devices, according to one or more example embodiments.
Figure 3:
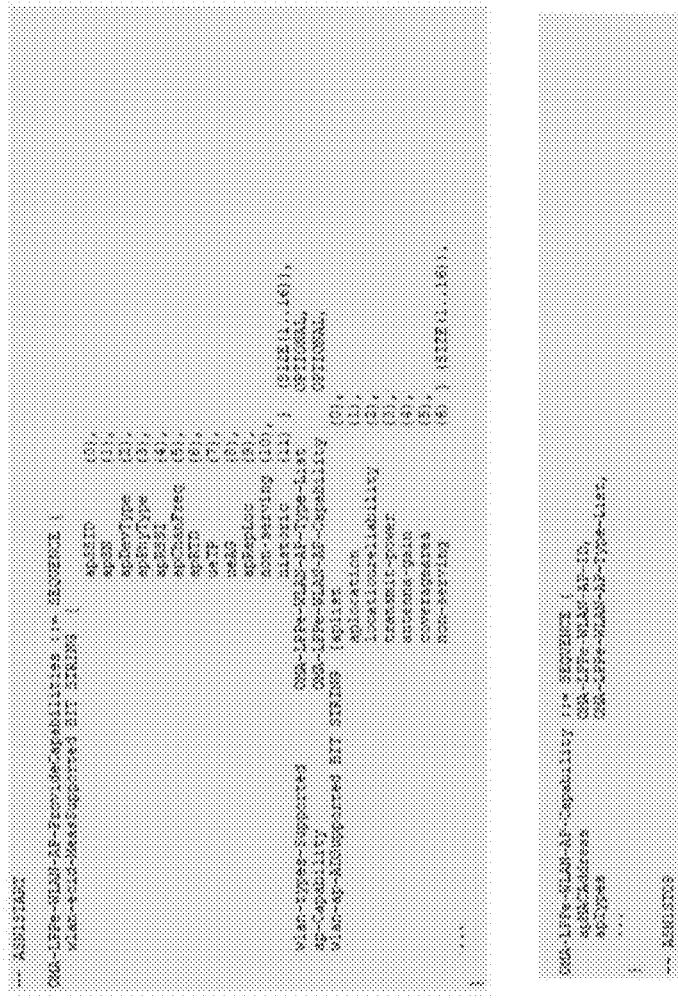
FIG. 3 illustrates example APIs for use in systems and devices, according to one or more example embodiments.

In one example embodiment, the SUPL server, which may be deployed by a telecom operator or carrier, may be able to leverage its secured interface to configure the TNEs, for example. The application programming interfaces (APIs) may include OMALPPeWLANAPRequestCapabilities 200 as illustrated in FIG. 2, for example, and OMALPPeW-LANAPProvideCapabilities 300 as illustrated in FIG. 3, which may include an additional bit or information element such as the WLANAllowToPerformLCIRequestFromUser API, which may optionally include an aging setting, for example.

In another example embodiment, location-based services (LBS) applications, such as a shopping-mall application, airport application, or operating system service via driver and operating system framework may provision the Wi-Fi location engine of TNEs. An exemplary application may be an airport application where the user may have agreed to the terms and conditions of a wireless network, which may provision the device to accept network-initiated location requests from its managed airport Wi-Fi access network, for example. Exemplary Wi-Fi Driver API, for example, SetTrustedNetworkEntity, may include information including a BSSID list, BSSID information, and aging information, for example. Another implementation may be based on real-time notification of the user when a LCI request is received by the device, for example. In this case, the user may choose to allow or refuse the request, for example.

Figure 4:
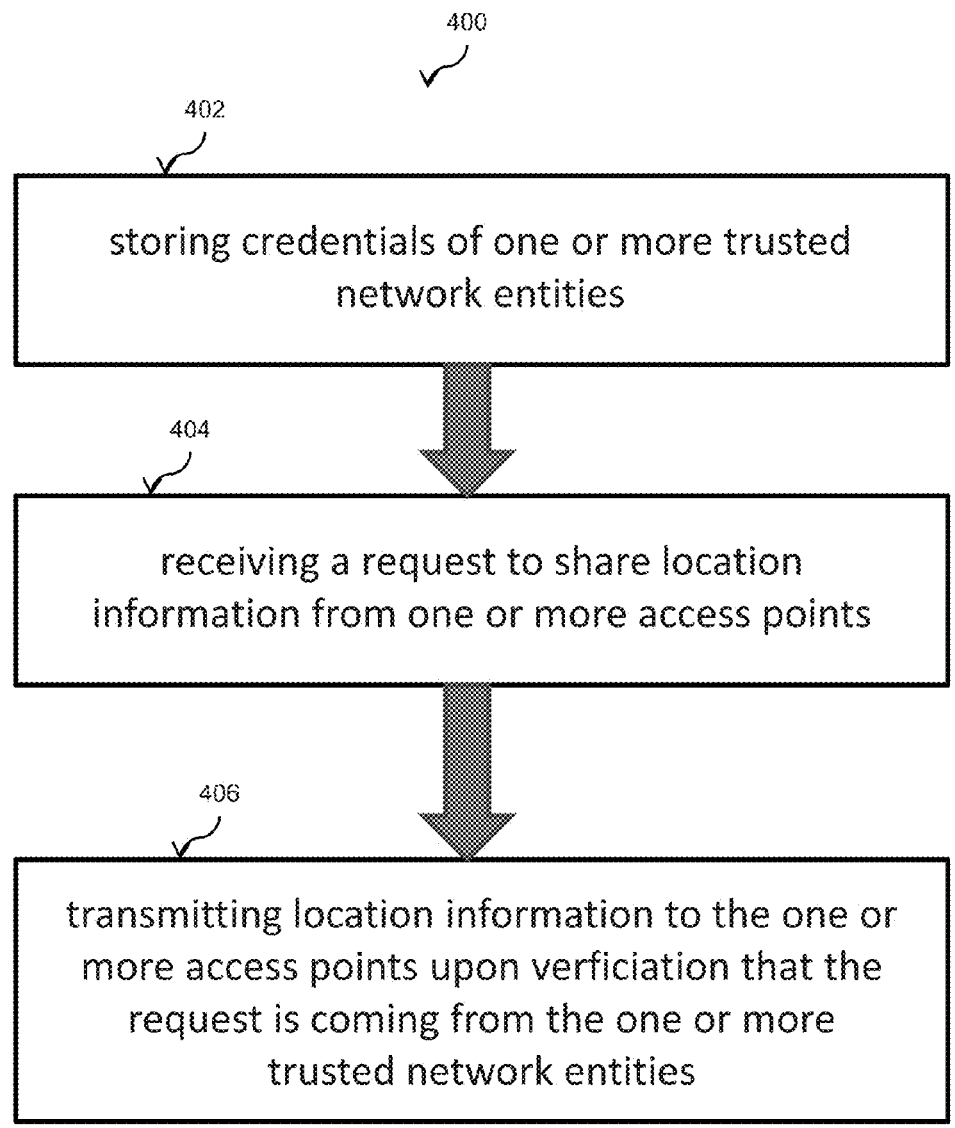
FIG. 4 illustrates example operations in a method for use in systems and devices, according to one or more example embodiments.

FIG. 4, for example, illustrates example operations that may be involved in a method 400 for provisioning Wi-Fi based network initiated location, according to one or example embodiments of the disclosure. The method may include operation 402 where a Wi-Fi location engine in one or more mobile communication stations, such as a smartphone or tablet, may store, either temporarily or permanently, credentials of one or more trusted network entities in a wireless network. Credentials may include a BSSID, SSID, or any such information relating to one or more access points in that network. Network-based provisioning may be provided by extending assisted GPS protocols, such as open mobile alliance (OMA) secure user plane location (SUPL) and third generation partnership project (3GPP) long term evolution (LTE) positioning protocol (LPP) that may provision Wi-Fi based network initiated location requests and may provide a THE list, including a BSSID or service set identification (SSID) list, through a remote SUPL server that may store this information, for example.

In operation 404, the one or more mobile communication stations may receive a request to share location information from one or more access points. The request may include a ToF request or FTM request, for example. In operation 406, the one or more communication stations may verify that the access point requesting location information is a trusted network entity whose identity may be listed in a BSSID list, for example. In operation 406, the one or more mobile devices may send location information to the one or more access points requesting the information. In another example embodiment, the one or more mobile devices or communication stations may be configured such that it may share location with any access point requesting location information, irrespective of whether or not that access point is a trusted network entity. In another example embodiment, the one or more mobile devices or communication stations may only share with access points connected to a particular network, such as the shopping mall or airport application network described above.

Figure 5:
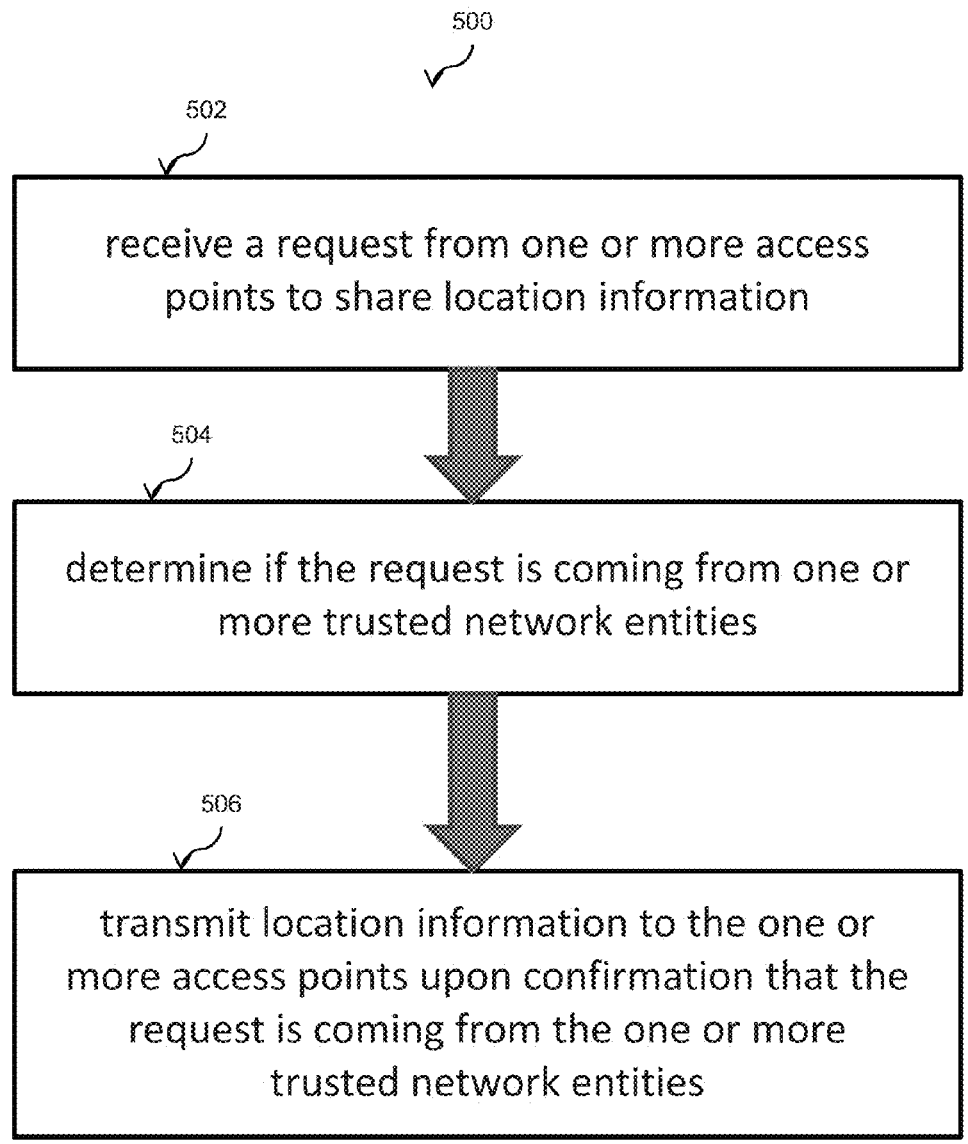
FIG. 5 illustrates example operations in a method for use in systems and devices, according to one or more example embodiments.

FIG. 5, for example, illustrates example operations that may be involved in a method 500 for provisioning Wi-Fi based network initiated location, according to one or example embodiments of the disclosure. The method may include operation 502 where a mobile device or communication station may receive a request from one or more access points to share location information. Such a request may include a ToF request or a FTM request, for example. Upon receipt of the request, the mobile device or communication stations may, in operation 504, verify whether the access point requesting location information is a trusted network entity whose identity may be listed in an approved BSSID list, for example. The verification operation may be carried out, for example, by connecting to a remote SUPL server that may store credentials of various TNEs. Then in operation 506, the mobile device or communication station may send location information to the access point requesting the information upon verification that the request is coming from one or more trusted network entities. In another example embodiment, the mobile device or communication station may be configured such that it may share location with any access point requesting location information, irrespective of whether or not that access point is a trusted network entity. In another example embodiment, the mobile device or communication station may only share with access points connected to a particular network, such as the shopping mall or airport application network described above.

Figure 6:
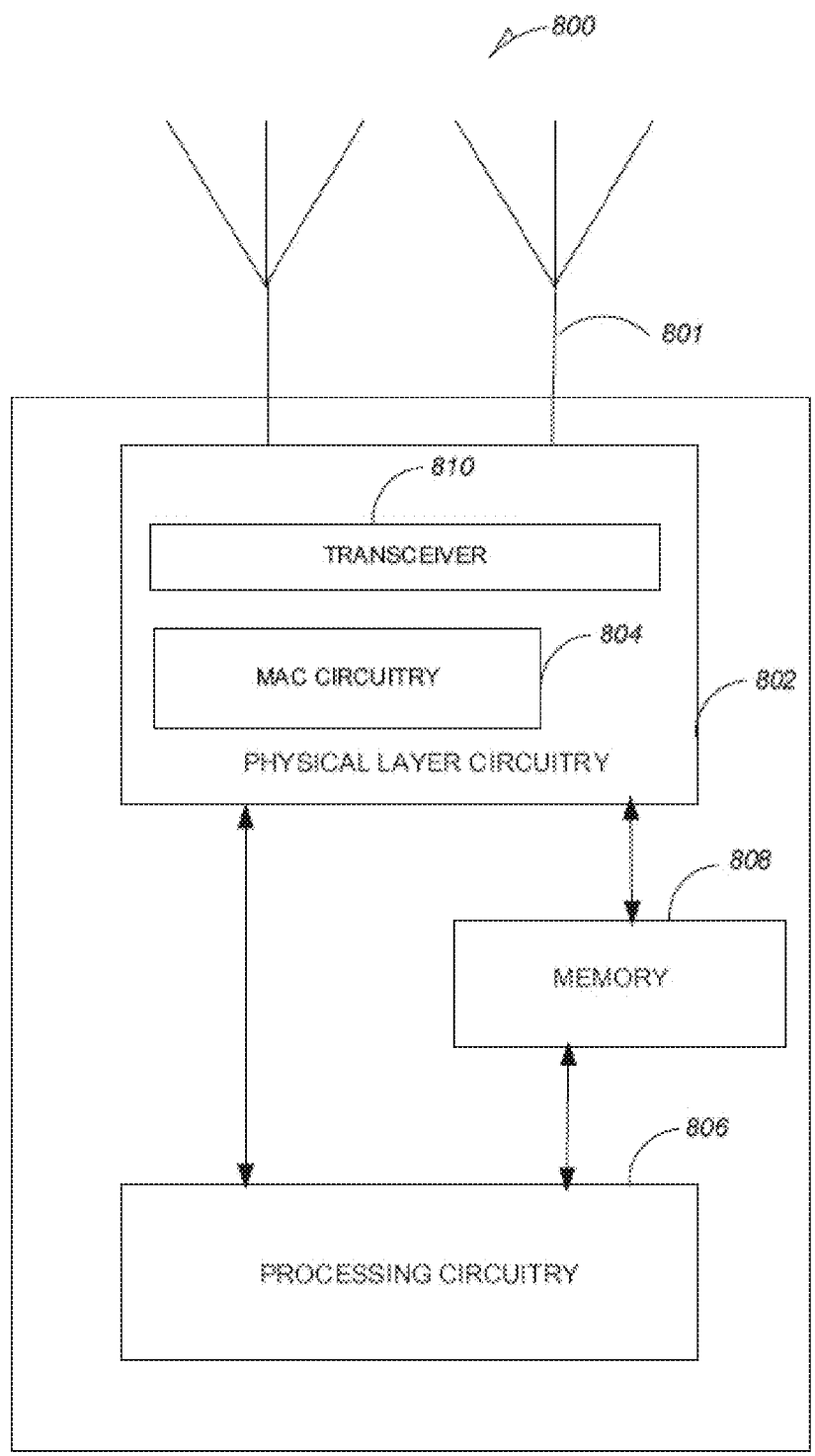
FIG. 6 illustrates a functional diagram of an example communication station or example access point, according to one or more example embodiments.

FIG. 6 shows a functional diagram of an exemplary communication station 800 in accordance with some embodiments of the disclosure. In one embodiment, FIG. 6 illustrates a functional block diagram of a communication station that may be suitable for use as an AP 102 (FIG. 1) or communication station STA 104 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include physical layer circuitry 802 having a transceiver 810 for transmitting and receiving signals to and from other communication stations using one or more antennas 801. The physical layer circuitry 802 may also include medium access control (MAC) circuitry 804 for controlling access to the wireless medium. The communication station 800 may also include processing circuitry 806 and memory 808 arranged to perform the operations described herein. In some embodiments, the physical layer circuitry 802 and the processing circuitry 806 may be configured to perform operations detailed in FIGS. 2-5.

In accordance with some embodiments, the MAC circuitry 804 may be arranged to contend for a wireless medium and configure frames or packets for communicating over the wireless medium and the physical layer circuitry 802 may be arranged to transmit and receive signals. The physical layer circuitry 802 may include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the physical layer circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device that may include, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 7:
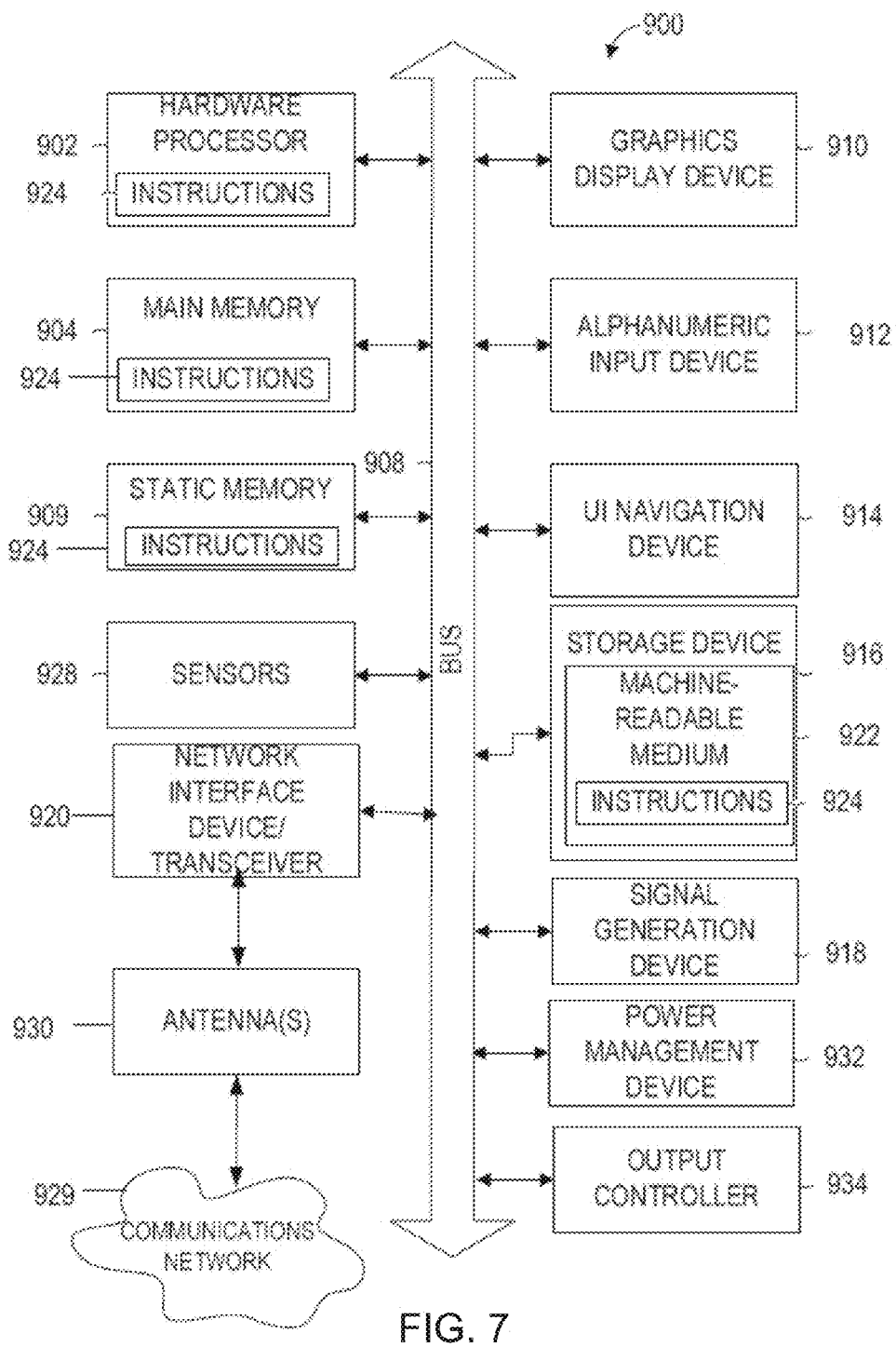
FIG. 7 shows a block diagram of an example of a machine upon which any of one or more techniques (e.g., methods) may be performed according to one or more embodiments discussed herein.

FIG. 7 illustrates a block diagram of an example of a machine 900 or system upon which any one or more of the techniques (e.g., methodologies) may be performed with respect to certain embodiments of the disclosure discussed herein. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 909, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912 and UI navigation device 914 may be a touch screen display. The machine 900 may additionally include a storage device (i.e., drive unit) 916, a signal generation device 918 (e.g., a speaker), a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 929 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 929. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible media to facilitate communication of such software.

Example Embodiments

One example embodiment is a method including storing, by a wireless communication device, credentials of one or more trusted network entities in a wireless network, receiving, by the wireless communication device, a request for location information from one or more access points, and transmitting, by the wireless communication device, location information of the wireless communication device to the one or more access points based, at least in part, upon verification of the credentials of the one or more access points. The request may include location configuration information request, time of flight request or a fine timing measurement request. The method may also include the operation of storing one or more aging parameters for the one or more trusted network entities. The credentials may include basic service set identification or service set identification. The credentials may be obtained using one or more assisted GPS protocols including open mobile alliance secure user plane location or third generation partnership project long term evolution positioning protocol.

Another example embodiment is a wireless communication device for provisioning in a wireless network. The device includes physical layer circuitry, one or more antennas, at least one memory, and one or more processing elements for storing credentials of one or more trusted network entities in the wireless network, receiving a request for location information from one or more access points, and transmitting location information to the one or more access points based, at least in part, upon verification of the credentials of the one or more access points. The request may include location configuration information request, time of flight request or a fine timing measurement request. The device may store one or more aging parameters for the one or more trusted network entities. The credentials may include basic service set identification or service set identification. The credentials may be obtained using one or more assisted GPS protocols including open mobile alliance secure user plane location or third generation partnership project long term evolution positioning protocol.

Another example embodiment is a non-transitory computer readable storage device including instructions stored thereon, which when executed by one or more processor(s) of a wireless communication device, cause the wireless communication device to perform operations of storing credentials of one or more trusted network entities in a wireless network, receiving a request for location information from one or more access points in the network, and transmitting location information to the one or more access points based, at least in part, upon verification of the credentials of the one or more access points. The request may include location configuration information request, time of flight request or a fine timing measurement request. The device may store one or more aging parameters for the one or more trusted network entities. The credentials may include basic service set identification or service set identification. The credentials may be obtained using one or more assisted GPS protocols including open mobile alliance secure user plane location or third generation partnership project long term evolution positioning protocol.

Another example embodiment is a system including one or more wireless communication devices, one or more access points wirelessly connected to the one or more wireless communication devices, and a server storing credentials of one or more trusted network entities, the one or more trusted network entities comprising at least one of the one or more access points, wherein the one or more wireless communication devices transmits location information to the one or more access points based, at least in part, upon verification of the credentials of the one or more access points as a trusted network entity. The credentials may include basic service set identification or service set identification of the one or more trusted network entities. The credentials may be obtained using one or more assisted GPS protocols including open mobile alliance secure user plane location or third generation partnership project long term evolution positioning protocol.

Another example embodiment is a method including storing, by a first wireless communication device, credentials of one or more trusted network entities in a wireless network, receiving, by the first wireless communication device, a request for location information from a second wireless communication device, and transmitting, by the first wireless communication device, location information of the first wireless communication device to the second wireless communication device based, at least in part, upon verification of the credentials of the second wireless communication device.

Another example embodiment is a wireless communication device including at least one memory comprising computer-executable instructions stored thereon, and one or more processing elements to execute the computer-executable instructions for storing credentials of one or more trusted network entities in a wireless network, receiving a request for location information from one or more second wireless communication devices, and transmitting location information to the one or more second wireless communication devices based, at least in part, upon verification of the credentials of the one or more second wireless communication devices as a trusted network entity.

Another example embodiment is a non-transitory computer readable storage device including instructions stored thereon, which when executed by one or more processor(s) of a wireless communication device, cause the wireless communication device to perform operations of storing credentials of one or more trusted network entities in a wireless network, receiving a request for location information from one or more second wireless communication devices in the network, and transmitting location information to the one or more second wireless communication devices based, at least in part, upon verification of the credentials of the one or more second wireless communication devices as a trusted network entity.

While there have been shown, described and pointed out, fundamental novel features of the disclosure as applied to the exemplary embodiments thereof, it will be understood that various omissions and substitutions and changes in the form and details of devices illustrated, and in their operation, may be made by those skilled in the art without departing from the spirit of the disclosure. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A method comprising:
storing, by a wireless communication device, a list of credentials of one or more trusted network entities in a wireless network;
receiving, by the wireless communication device, a request for location information, wherein the request comprises a fine timing measurement request from one or more access points; and
transmitting, by the wireless communication device, location information of the wireless communication device to the one or more access points based, at least in part, upon determining the one or more access points are from the list of credentials of the one or more trusted network entities.

2. The method of claim 1, further comprising:
storing one or more aging parameters for the one or more trusted network entities.

3. The method of claim 1, wherein the credentials comprise basic service set identification or service set identification.

4. The method of claim 1, wherein credentials are obtained using one or more assisted GPS protocols.

5. The method of claim 4, wherein the one or more assisted GPS protocols comprise open mobile alliance secure user plane location or third generation partnership project long term evolution positioning protocol.

6. A wireless communication device comprising:
at least one memory comprising computer-executable instructions stored thereon; and
one or more processing elements to execute the computer-executable instructions for:
storing a list of credentials of one or more trusted network entities in a wireless network;
receiving a request for location information, wherein the request comprises a fine timing measurement request from one or more access points; and
transmitting location information to the one or more access points based, at least in part, upon determining the one or more access points are from the list of credentials of the one or more trusted network entities.

7. The device of claim 6, wherein the one or more processing elements further comprise:
storing one or more aging parameters for one or more trusted network entities.

8. The device of claim 6, wherein the credentials comprise basic service set identification or service set identification.

9. The device of claim 6, wherein the credentials are obtained using one or more assisted GPS protocols.

10. The device of claim 9, wherein the one or more assisted GPS protocols comprise open mobile alliance secure user plane location or third generation partnership project long term evolution positioning protocol.

11. A non-transitory computer readable storage device including instructions stored thereon, which when executed by one or more processor(s) of a wireless communication device, cause the wireless communication device to perform operations comprising:
storing a list of credentials of one or more trusted network entities in a wireless network;
receiving a request for location information, wherein the request comprises a fine timing measurement request from one or more access points; and
transmitting location information to the one or more access points based, at least in part, upon determining the one or more access points are from the list of credentials of the one or more trusted network entities.

12. The device of claim 11, wherein the instructions cause the wireless communications device to perform operations further comprising:
storing one or more aging parameters for one or more trusted network entities.

13. The device of claim 11, wherein the credentials comprise basic service set identification or service set identification.

14. The device of claim 11, wherein the credentials are obtained using one or more assisted GPS protocols.

15. The device of claim 14, wherein the one or more assisted GPS protocols comprise open mobile alliance secure user plane location or third generation partnership project long term evolution positioning protocol.

16. A wireless communication device comprising:
at least one memory comprising computer-executable instructions stored thereon; and
one or more processing elements to execute the computer-executable instructions for:
storing a list of credentials of one or more trusted network entities in a wireless network;
receiving a request for location information, wherein the request comprises a fine timing measurement request from one or more second wireless communication devices; and
transmitting location information to the one or more second wireless communication devices based, at least in part, upon determining the one or more second wireless communication devices are from the list of credentials of the one or more trusted network entities.

17. A non-transitory computer readable storage device including instructions stored thereon, which when executed by one or more processor(s) of a wireless communication device, cause the wireless communication device to perform operations of:
storing a list of credentials of one or more trusted network entities in a wireless network;
receiving a request for location information, wherein the request comprises a fine timing measurement request from one or more second wireless communication devices; and
transmitting location information to the one or more second wireless communication devices based, at least in part, upon determining the one or more second wireless communication devices are from the list of credentials of the one or more trusted network entities.

* * * * *